(12) United States Patent
Yoo

(10) Patent No.: US 8,044,826 B2
(45) Date of Patent: Oct. 25, 2011

(54) INPUT DEVICE AND PORTABLE TERMINAL HAVING THE SAME

(75) Inventor: Joon-Hee Yoo, Incheon (KR)

(73) Assignee: LG Electronics Inc., Seoul (KR)

( * ) Notice: Subject to any disclaimer, the term of this patent is extended or adjusted under 35 U.S.C. 154(b) by 627 days.

(21) Appl. No.: 12/251,401

(22) Filed: Oct. 14, 2008

(65) Prior Publication Data

US 2009/0096639 A1   Apr. 16, 2009

(30) Foreign Application Priority Data

Oct. 15, 2007   (KR) .................. 10-2007-0103721

(51) Int. Cl.
*H03M 1/22* (2006.01)
(52) U.S. Cl. .......................... 341/20; 341/22
(58) Field of Classification Search ............ 341/20, 341/22; 345/157, 184; 200/4
See application file for complete search history.

(56) References Cited

U.S. PATENT DOCUMENTS

| 7,417,422 B2 * | 8/2008 | Kang ................. 324/207.25 |
| 2005/0068134 A1 | 3/2005 | Nishino et al. |
| 2008/0068337 A1 * | 3/2008 | Yim et al. ............... 345/160 |
| 2011/0134029 A1 * | 6/2011 | Park et al. ............... 345/157 |

* cited by examiner

*Primary Examiner* — Danny Nguyen
(74) *Attorney, Agent, or Firm* — Lee, Hong, Degerman, Kang & Waimey

(57) ABSTRACT

An input device comprises: a circuit board having a magnetism sensing portion for sensing changes of magnetism; a magnet disposed above the circuit board by a prescribed height, and configured to move in a plurality of directions; and a shuttle having a magnet mounting portion for fixing the magnet at the center thereof, and having a plurality of elastic connecting portions radially disposed around the magnet mounting portion, the elastic connecting portions formed in curved lines from the center of the magnet so as to elastically support the magnet mounting portion.

28 Claims, 8 Drawing Sheets

INPUT DEVICE AND PORTABLE TERMINAL HAVING THE SAME

RELATED APPLICATION

The present disclosure relates to a subject matter contained in priority Korean Application No. 10-2007-0103721, filed on Oct. 15, 2007, which is herein expressly incorporated by reference in its entirety.

BACKGROUND OF THE INVENTION

1. Field of the Invention

The present invention relates to an input device for a portable terminal configured to move a cursor, a pointer, and so on, and a portable terminal having the same.

2. Background of the Invention

In general, a portable terminal serves as a portable device having one or more functions such as voice and video calls, information input/output, and data storage.

As the portable terminal now provides many additional services beside the basic call service, a user can capture photos or moving images, reproduce music or moving image files, play games, receive broadcasting programs, and so on. The portable terminal is implemented as a multimedia player.

In order to implement complicated functions of the multimedia player, various attempts are being performed in hardware or software aspects. For instance, a user interface to allow a user to easily and conveniently search or select functions is provided.

In case of a keypad of the related art portable terminal, a plurality of keys to move a pointer or a cursor have to repeatedly pressed or touched so as to search a great deal of contents. This may cause inconvenience to a user. To solve the problem, there has been provided an input device for a portable terminal. The input device is configured to rapidly search or access desired information through manipulations to move a user's finger in different directions from the center.

However, the related art input device for a portable terminal is implemented to emphasize click feeling with respect to a finger's moving direction. This may cause an input operation not to be smoothly performed, and require great force during the input operation.

SUMMARY OF THE INVENTION

Therefore, an object of the present invention is to provide an input device for a portable terminal capable of implementing a finger's natural motion, and enhancing accuracy of input, and a portable terminal having the same.

To achieve these and other advantages and in accordance with the purpose of the present invention, as embodied and broadly described herein, there is provided an input device for a portable terminal, comprising: a circuit board having a magnetism sensing portion for sensing changes of magnetism; a magnet disposed above the circuit board by a prescribed height, and configured to move in a plurality of directions; and a shuttle having a magnet mounting portion for fixing the magnet at the center thereof, and having a plurality of elastic connecting portions radially disposed around the magnet mounting portion, the elastic connecting portions formed in curved lines from the center of the magnet so as to elastically support the magnet mounting portion.

The magnet may be moved in a plurality of directions with a supported status by the shuttle when a user's finger moves, and each motion of the magnet is sensed by a magnetism sensing portion thereby to be received as an input signal. The elastic connecting portions that support the magnet move the magnet from an initial position with being transformed, and restore the magnet to the initial position when an applied external force is removed. As the elastic connecting portions are reciprocally operated, manipulations to move the magnet may be smoothly performed.

End parts of the elastic connecting portions may be supported by being fixed to the periphery of a housing having a through hole at the center thereof. An edge of the housing may be provided with one pair of hooks fixed to the circuit board; and one pair of locator pins inserted into the circuit board, for fixing the position of the housing with respect to the circuit board.

The magnet may be covered with a cap, and the cap may be installed so as to be protruding from the through hole and to move within a region of the through hole. The cap may serve as a lever or a handgrip to for manipulations.

The magnetism sensing portion may be mounted onto a lower surface of the circuit board, and a dome switch configured to perform an input operation as the magnet mounting portion is pressed may be mounted to an upper surface of the circuit board. Once the magnet mounting portion is pressed, a pointer and so one are moved to instruct indicated items or menus to be executed.

A lower surface of the magnet mounting portion may be formed in a round shape so as to reduce a frictional force with the circuit board or an upper surface of the dome switch, and so as to enhance tactile feeling in moving the magnet.

Preferably, a lubrication member for reducing friction of the magnet mounting portion may be provided on an upper surface of the dome switch. The lubrication member may have a mesh-type of pattern on its upper surface contacting the magnet mounting portion, thereby reducing a frictional area and enhancing a lubrication performance. The lubrication member may be bonded onto the circuit board in the form of sheet, which facilitates a mounting process.

The elastic connecting portions may be horizontally disposed, and each of the elastic connecting portions may be formed in an 'S' shape. The elastic connecting portions may be disposed in three in number with a gap therebetween of 120°. Under these configurations, once the magnet moves, one elastic connecting portion may be transformed in an expanded direction, whereas the other elastic connecting portion or another two elastic connecting portions may be transformed in a contracted direction.

On lower surfaces of the elastic connecting portions, formed are horizontal status maintaining protrusions that come in friction with the lubrication member, and configured to maintain each horizontal status of the elastic connecting portions. The horizontal status maintaining protrusions may prevent the elastic connecting portions from being transformed in a vertical direction, and allow the magnet to smoothly move in a horizontal direction. The horizontal status maintaining protrusions contacts the lubrication member thus to have less friction.

The input device for a portable terminal may further comprise a controller for compensating for a difference between an initial position and a preset initial position of the magnet. A difference between the current center of the magnet and the initial center of the magnet preset by the magnetism sensing portion may be compensated thus to enhance accuracy of input. The controller may be set so as to be operated whenever the portable terminal is booted.

To achieve these and other advantages and in accordance with the purpose of the present invention, as embodied and broadly described herein, there is also provided a portable terminal having the input device.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Figure 1:
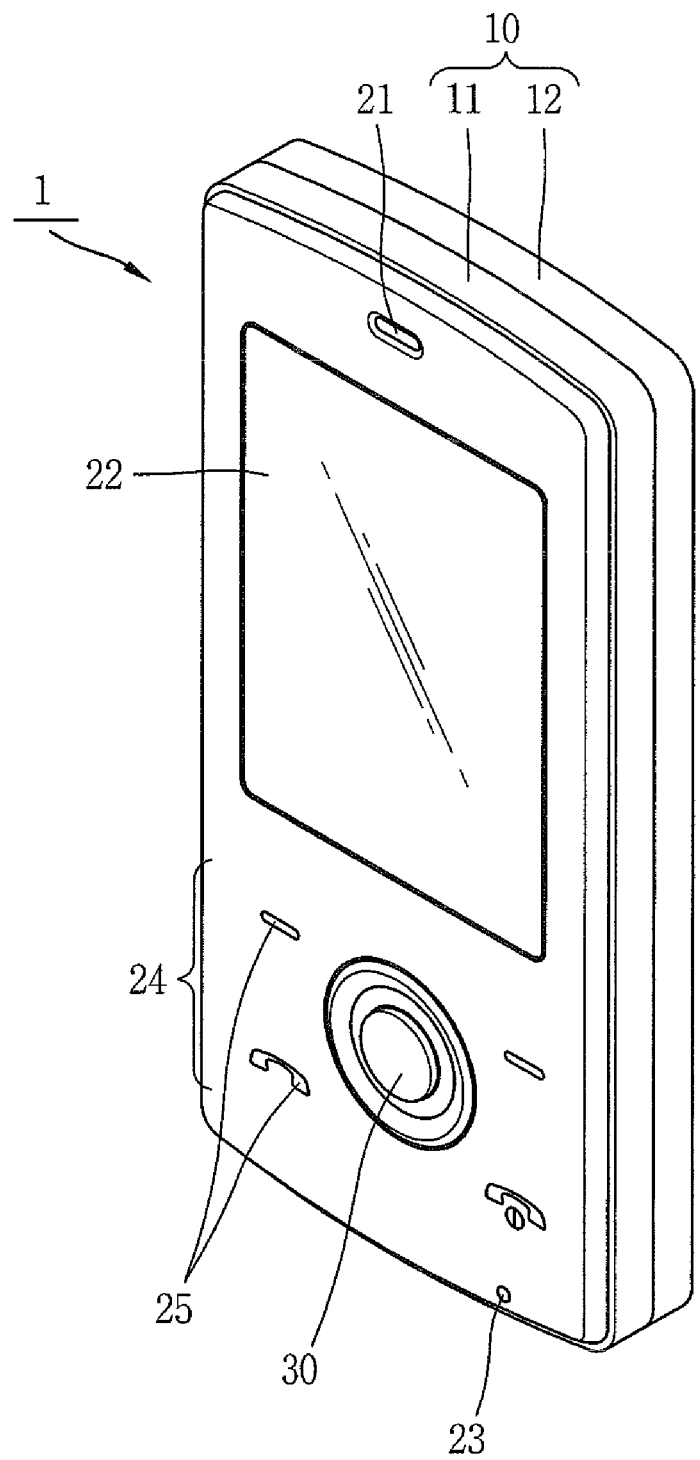
FIG. 1 is a front perspective view showing a portable terminal according to a first embodiment of the present invention.

FIG. 1 is a front perspective view showing a portable terminal according to a first embodiment of the present invention.

As shown in FIG. 1, the portable terminal 1 comprises a terminal body 10 that forms the appearance, a display unit 22 for outputting visual information, an audio output unit for outputting voice or audio information, a user input unit 24, and an audio input unit 23 for inputting audio information.

The user input unit 24 includes key input portions 25 disposed at a plurality of positions, and an input device 30 for moving a pointer or a cursor and so on to a desired direction by being moved to a plurality of directions from the center position.

Figure 2:
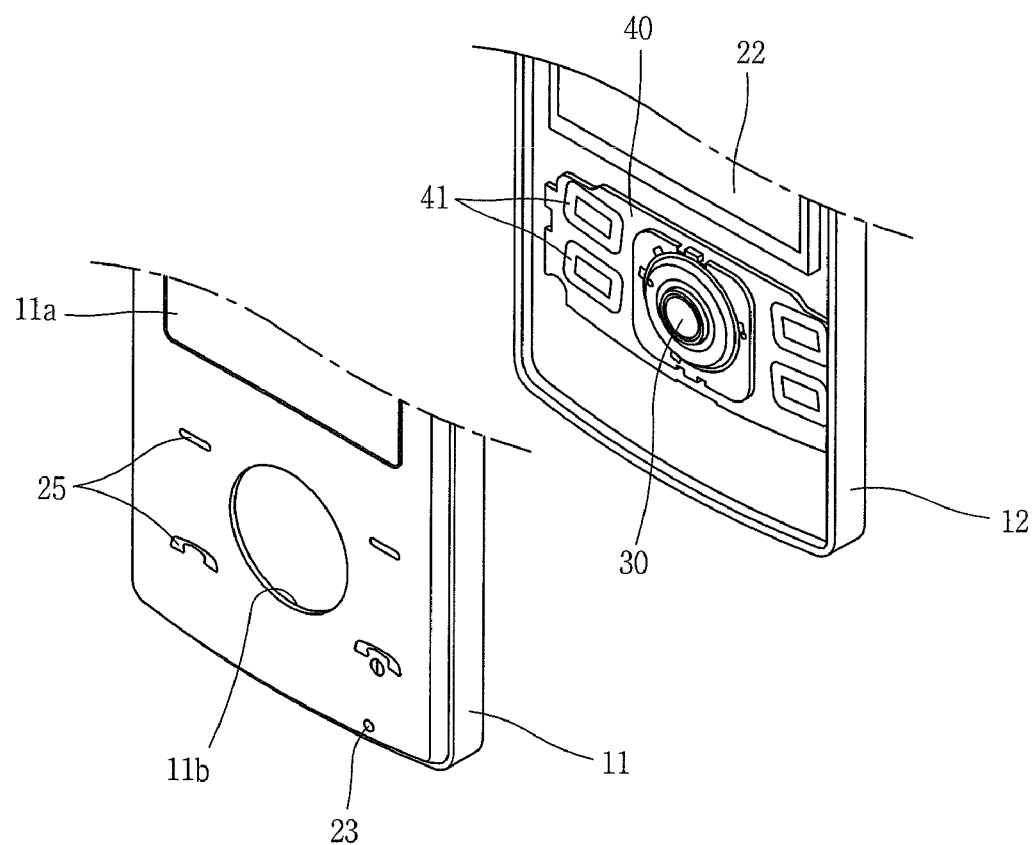
FIG. 2 is an exploded perspective view showing a front case of the portable terminal of FIG. 1.

FIG. 2 is an exploded perspective view showing a front case of the portable terminal of FIG. 1.

As shown in FIG. 2, the terminal body 10 is divided into a front case 11 and a rear case 12. The front case 11 includes a window region 11a for implementing the display unit 22, and an installation hole 11b through which the input device 30 is exposed out.

A circuit board 40 is disposed in the installation hole 11b, and is provided with touch sensing portions 41 arranged according to each key.

The touch sensing portions 41 sense touch applied to keys of the front case 11, and generate control signals so as to execute corresponding inputs. The key input portions 25 may be implemented by combining buttons and a switch turned ON/OFF by the buttons.

Figure 3:
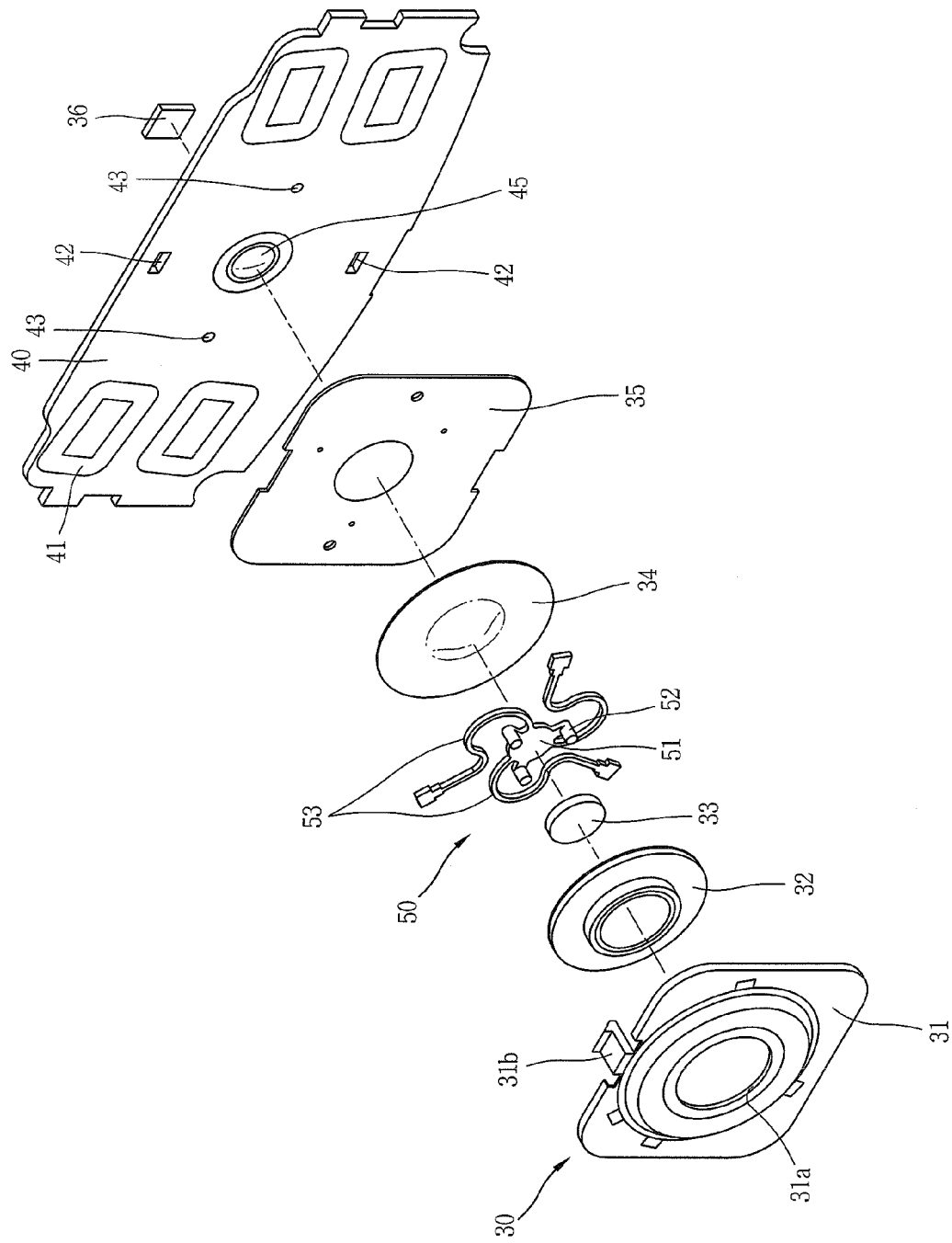
FIG. 3 is an exploded perspective view showing an input device of FIG. 2.

FIG. 3 is an exploded perspective view showing the input device of FIG. 2.

As shown in FIG. 3, the input device 30 includes a housing 31, a cap 32, a magnet 33, a shuttle 50, a lubrication member 34, a dome switch bonding sheet 35, a circuit board 40, and a magnetism sensing portion 36.

The housing 31 is configured so as to be fixed to the circuit board 40 with fixing and supporting the shuttle 50. At the center of the housing 31, formed is a through hole 31a for allowing the cap 32 to have a moving region in a plurality of directions.

One pair of hooks 31b fixed to the circuit board 40 are formed at an edge of the housing 31. And, hook holes 42 for passing the hooks 31b and locking the hooks 31b at lower surfaces thereof are formed at the circuit board 40.

The cap 32 is formed so as to cover the magnet 33, and is fixed to the shuttle 50. The cap 32 may be provided with a friction groove on an upper surface thereof, thereby allowing a user to easily manipulate the cap 32, without sliding, by his or her finger and so on. The cap 32 may serve as a lever or a handgrip for manipulations.

The magnet 33 is disposed above the circuit board 40 by a prescribed height, so that the magnetism sensing portion 36 mounted on a lower surface of the circuit board 40 can sense changes of magnetism of the magnet 33. And, the magnet 33 is installed at the shuttle 50 so as to be movable in a plurality of directions.

The shuttle 50 includes a magnet mounting portion 51 for mounting the magnet 33, and a plurality of elastic connecting portions 53 radially disposed around the magnet mounting portion 51.

The magnet mounting portion 51 may be provided with a plurality of pillars 52 arranged in a circumferential direction, and serving to insert the magnet 33 for fixation.

The elastic connecting portions 53 are formed in curved lines from the center of the magnet 33 so as to elastically support the magnet mounting portion 51. The elastic connecting portions 53 are horizontally disposed in 'S' shapes. Referring to FIG. 3, the elastic connecting portions 53 may be disposed in three in number with a gap therebetween of 120°. Under these configurations, once the magnet 33 moves, one elastic connecting portion may be transformed in an expanded direction, whereas the other elastic connecting portion or another two elastic connecting portions may be transformed in a contracted direction. The elastic connecting portions 53 are configured so as to be integrally operated as the magnet mounting portion 51 moves. Differently from FIG. 3, the elastic connecting portions 53 may be implemented in four or more than in number. The elastic connecting portions 53 may be formed of resin in a thin and long shape to apply an elastic force in a horizontal moving direction of the magnet 33. Also, the elastic connecting portions 53 may be integrally formed with the housing 31.

The magnet 33 may be moved in a plurality of directions with a supported status by the shuttle 50 according to a finger's motion, and each motion of the magnet 33 is sensed by the magnetism sensing portion 36 thereby to be received as an input signal. The elastic connecting portions 53 that support the magnet 33 move the magnet 33 from an initial position with being transformed, and restore the magnet 33 to the initial position when an applied external force is removed.

A dome switch 45 is provided below the magnet mounting portion 51. The dome switch 45 is attached onto the circuit board 40 by the dome switch bonding sheet 35.

A lubrication member 34 for reducing friction of the magnet mounting portion 51 is provided on an upper surface of the dome switch 45. Referring to FIG. 3, the lubrication member 34 is bonded onto the circuit board 40 in the form of sheet, which facilitates a mounting process.

Figure 4:
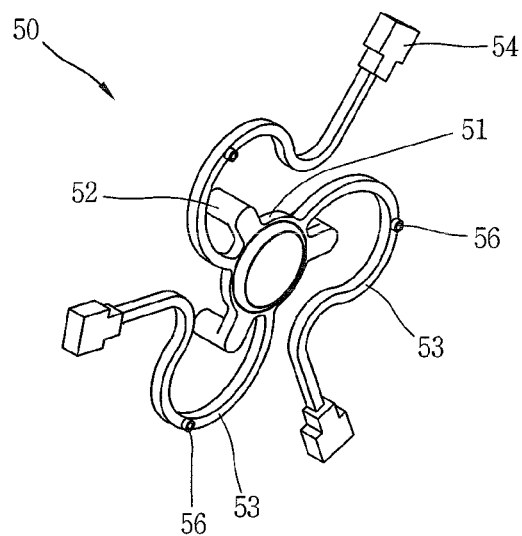
FIG. 4 is a perspective view showing a bottom of a shuttle.

FIG. 4 is a perspective view showing a bottom of a shuttle. Referring to FIG. 4, a lower surface of the magnet mounting portion 51 is formed in a round shape so as to minimize friction when contacting the lubrication member 34.

On lower surfaces of the elastic connecting portions, formed are horizontal status maintaining protrusions 56 that come in friction with the lubrication member 34, and configured to maintain each horizontal status of the elastic connecting portions 53. The horizontal status maintaining protrusions 56 may prevent the elastic connecting portions 53 from being transformed in a vertical direction, and allow the magnet 33 to smoothly move in a horizontal direction. The horizontal status maintaining protrusions 56 more reduce friction by contacting the lubrication member 34.

End parts 54 of the elastic connecting portions 53 are formed in a shape corresponding to that of fitting grooves 31d disposed at the periphery of a through hole 31a of the housing 31, thereby being fitted and fixed to the fitting grooves 31d.

Figure 6:
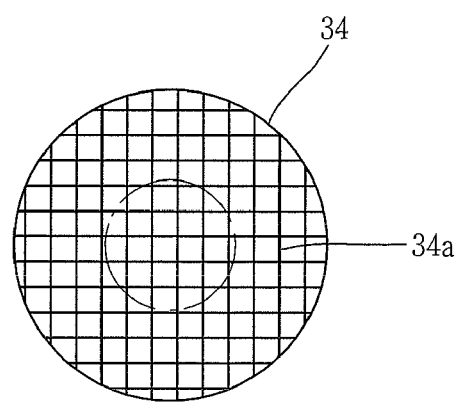
FIG. 6 is a planar view showing a lubrication member.

FIG. 6 is a planar view showing the lubrication member. As shown in FIG. 6, the lubrication member 34 has a mesh-type of pattern on its upper surface contacting the magnet mounting portion 51.

That is, the lubrication member 34 serves to enhance a lubricating performance by reducing a frictional area of the magnet mounting portion 51 or the horizontal status maintaining protrusions 56. The lubrication member 34 may be formed of a material having an excellent lubricating characteristic such as fluororesin (teflon).

Figure 5:
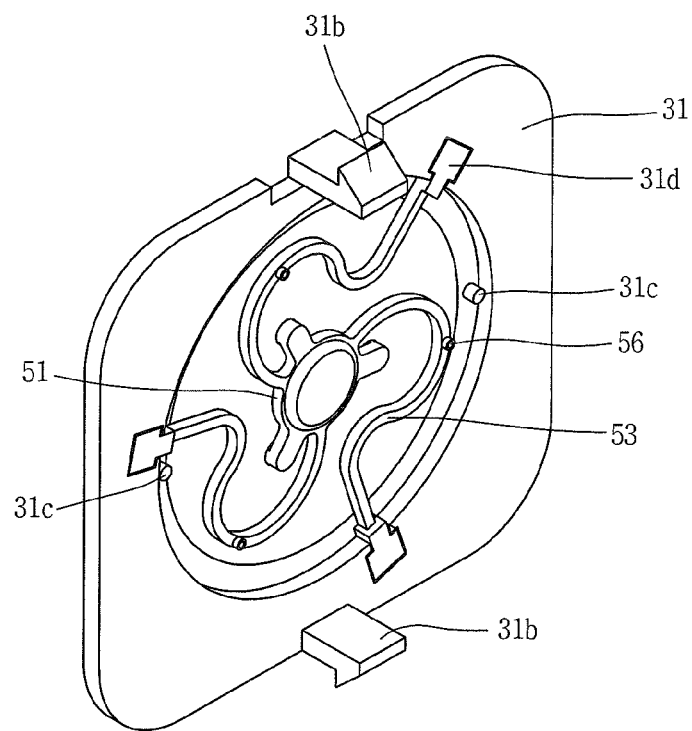
FIG. 5 is a perspective view showing a bottom of an assembly implemented as the shuttle is assembled to a housing.

FIG. 5 is a perspective view showing a bottom of an assembly implemented as the shuttle 50 is assembled to the housing 31.

As shown in FIG. 5, the end parts 54 of the elastic connecting portions 53 of the shuttle 50 are fitted to the fitting grooves 31d of the housing 31, thereby enabling the magnet mounting portion 51 to move in a horizontal direction.

In order for the assembly between the shuttle 50 and the housing 31 to be stably fixed to the circuit board 40, one pair of locator pins 31c inserted into the circuit board 40 are formed at a bottom surface of the housing 31. In correspondence to the locator pins 31c, one pair of locator pin insertion holes 43 for inserting the locator pins 31c may be formed at the circuit board 40 (refer to FIG. 3).

The housing 31 that supports the shuttle 50 can maintain a stably fixed status on the circuit board 40 by combinations between the hooks 31b and the locator pins 31c.

Figure 7:
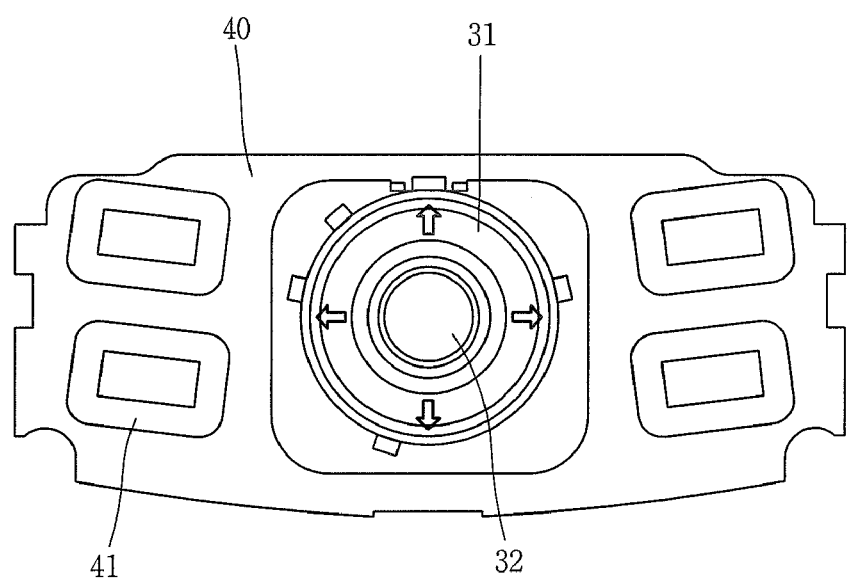
FIG. 7 is a planar view showing an assembly implemented as an input device is fixed to a circuit board.

FIG. 7 is a planar view showing an assembly implemented as the input device is fixed to the circuit board;

As shown in FIG. 7, the assembly between the shuttle 50 and the housing 31 is assembled to the circuit board 40. The exposed cap 32 is configured to move in upper, lower, right and left directions, within a region of the through hole 31a of the housing 31. The cap 32 can move in a concrete direction within the region of the through hole 31a, and can perform a circular motion. As the cap 32 moves, the magnetism sensing portion 36 senses changes of magnetism of the magnet 33 inside the cap 32, and thereby generates signals to move a pointer, or to execute specific functions.

According to the input device of the present invention, the magnet is moved far from the initial position and then is restored to the initial position as the elastic connecting portions are differently transformed. As the magnet is moved, the magnetism sensing portion serves to allow manipulations such as directional moving or function control to be executed.

Furthermore, in the present invention, manipulations are performed through the composite elastic transformations of the elastic connecting portions, and non-contact of the magnetic sensing portion, thereby implementing smooth and precise input.

Figure 8:
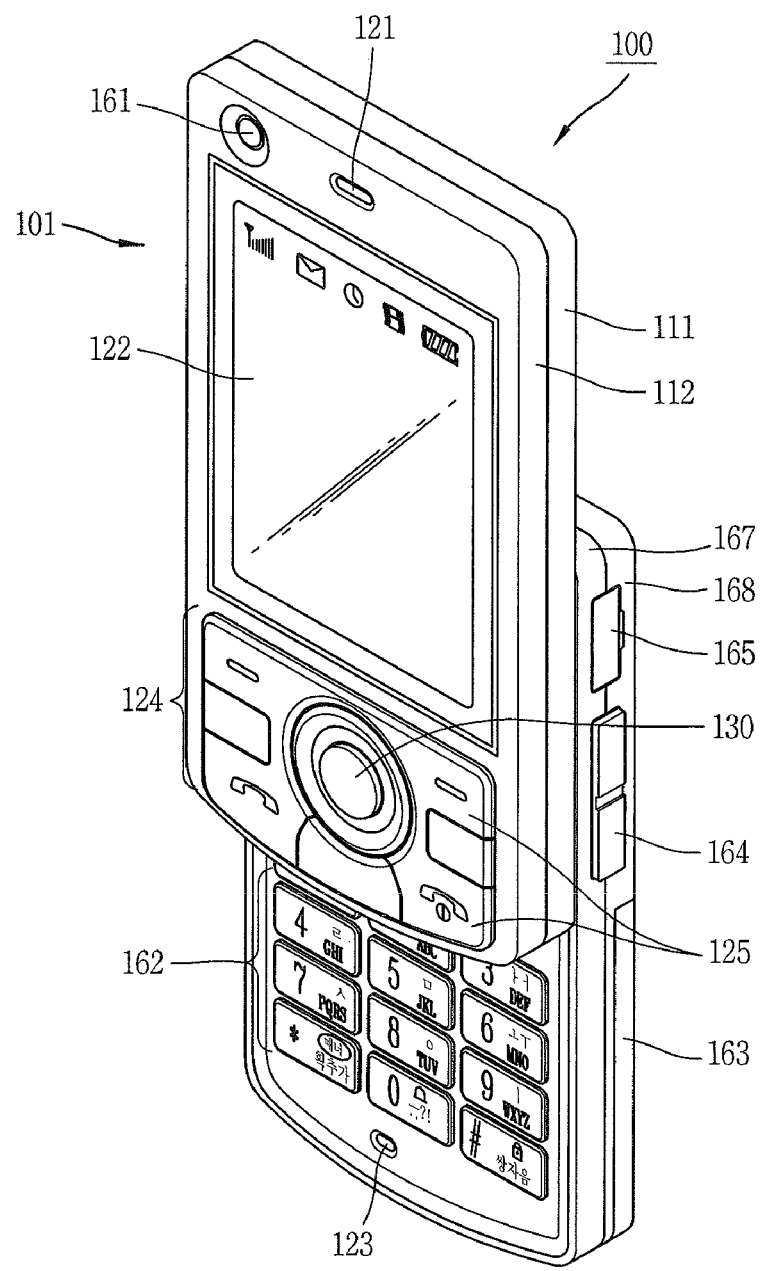
FIG. 8 is a front perspective view showing a portable terminal according to a second embodiment of the present invention.

FIG. 8 is a front perspective view showing a portable terminal according to a second embodiment of the present invention.

As shown in FIG. 8, the portable terminal 100 includes a first body 101, and a second body 102 configured to slidably cooperate with the first body 101 in one or more directions of the first body 101.

A status that the first body 101 is disposed to overlap the second body 102 is referred to as 'closed configuration', and a status that the first body 101 exposes at least one part of the second body 102 is referred to as 'open configuration'.

Typically, the portable terminal 100 functions in a standby mode when in the closed position, and a call mode when in the open position. However, the call mode may be converted into a standby mode by a user's manipulation or lapse of a certain time.

A case (casing, housing cover, etc.) that forms the appearance of the first body 101 is formed by a first front case 111 and a first rear case 112. Each kind of electronic components are mounted to a space formed by the first front case 111 and the first rear case 112. One or more intermediate cases may be provided between the first front case 111 and the first rear case 112. The front and rear cases may be formed by injection-molding synthetic resin, or formed using metallic material such as stainless steel (STS) and titanium (Ti).

On the first body 101, i.e., on the first front case 111, may be disposed a display unit 122, a first audio output unit 121, a first video input unit 161, or a first user input unit 124.

The display unit 122 may be implemented as a Liquid Crystal Display (LCD) module or an Organic Light Emitting Diodes (OLED) module, and so on. The display unit 122 may also be configured as a touch screen allowing information to be input by a user's touch.

The audio output unit 121 may be implemented as a speaker or a receiver.

The first video input unit 161 may be implemented as a camera module to capture still images or moving images of a user and so on.

The first user input unit 124 includes key input portions 125 and an input device 130 having similar functions as those of the key input portions 25 and the input device 30 of FIG. 1.

In the same manner as the first body 101, the second body 102 may include a second front case 167 and a second rear case 168.

On the second body 102, i.e., on a front surface of the second front case 167, may be disposed a second user input unit 162.

A third user input unit 164, an audio input unit 123, and an interface unit 165 may be disposed on at least one of the second front case 167 and the second rear case 168.

The first to third user input units 124, 162 and 164 may be referred to as manipulating portions, and may be implemented in a user's tactile manner. For instance, the user input unit may be implemented as a dome switch or a touch screen or a touch pad that can receive commands or information in a user's push or touch manner.

In the aspect of functions the first user input unit 124 serves to input commands such as start, stop, and scroll, and the second user input unit 162 serves to input numbers, or characters, or symbols. The third user input unit 164 may serve as hot keys to perform specific functions such as activation of the first video input unit 161.

The audio input unit 123 may be implemented as a microphone to receive a user's voice, another sound, etc.

The interface unit 165 serves as a passage through which the portable terminal of the present invention can exchange data with external devices. The interface unit 165 may be implemented by wire or by radio, and may include one of an access port to an earphone, a short-range communication port (e.g., IrDA port), a Bluetooth port, a wireless LAN port, and a power supply port for supplying power to the portable terminal.

The interface unit 165 may be a card socket for receiving an external card such as a subscriber identification module (SIM), a User Identification Module (UIM), and a memory card for storing information.

A power supply unit 163 for supplying power to components of the portable terminal 100 is mounted to the second rear case 168. The power supply unit 163 may be detachably mounted to the second rear case 168 as a chargeable battery.

Figure 9:
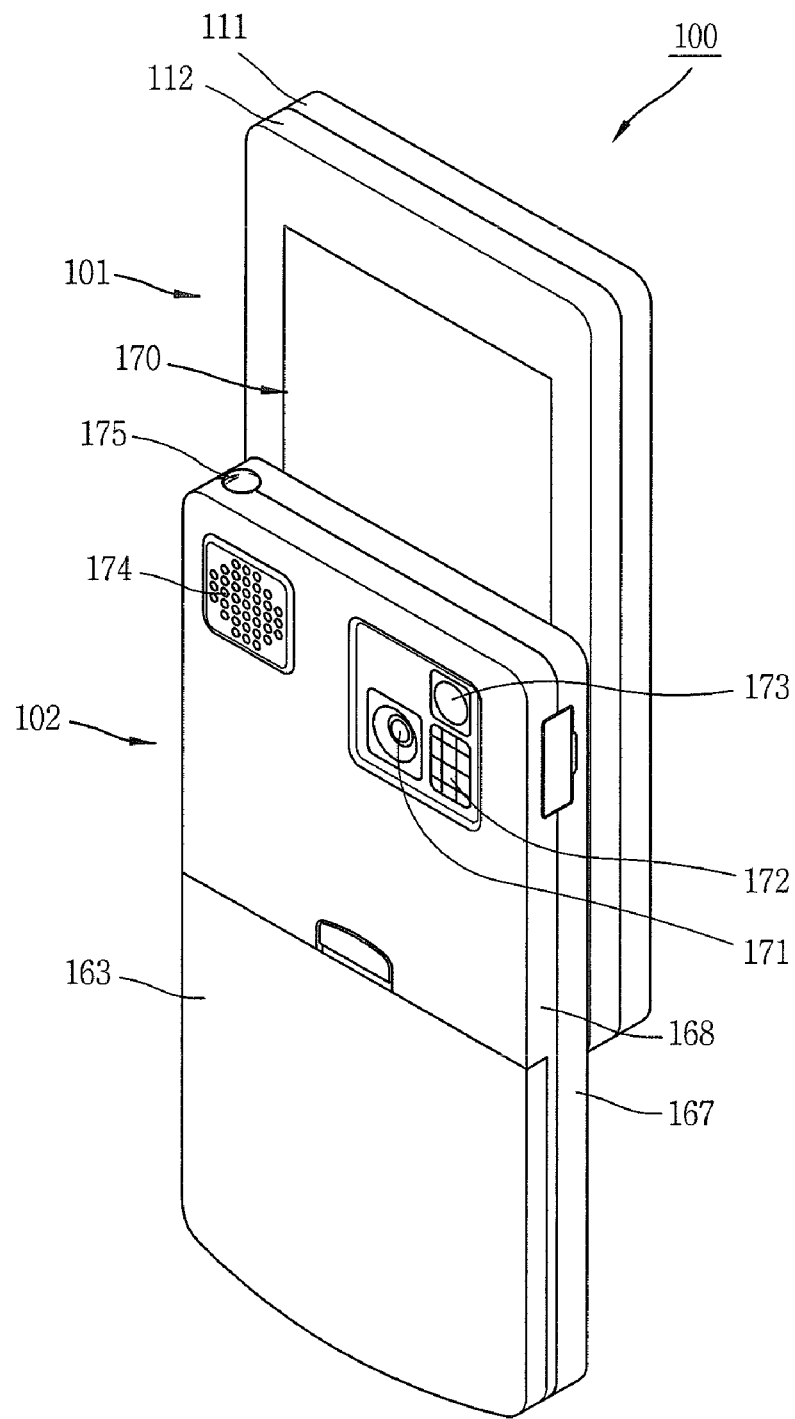
FIG. 9 is a rear perspective view showing the portable terminal of FIG. 8.

FIG. 9 is a rear perspective view of the portable terminal of FIG. 8.

Referring to FIG. 9, a second video input unit 171 may be additionally mounted to a rear surface of the second rear case 168 of the second body 102. In addition, the second video input unit 171 may be a camera implementing a capturing direction opposite to that of the first video input unit 161, and implementing a capability different from that of the first video input unit 161. For example, the first video input unit 161 operates with a relatively low resolution, whereas the second video input unit 171 operates with a relatively high resolution since a captured image is not immediately transmitted.

A flash 172 and a mirror 173 are additionally disposed near the second video input unit 171. The flash 172 provides light to a subject being captured by the second video input unit 171, and the mirror 173 is useful for assisting a user to position the second video input unit 171 in a self-portrait mode.

A second audio output unit 174 may be additionally disposed at the second rear case 168. The second audio output unit 174 may also cooperate with the first audio output unit 121 to provide stereo output. Moreover, either or both of these audio output units 121 and 174 may be configured to operate as a speakerphone.

The portable terminal 100 may also include a broadcast signal receiving antenna 175, rather than an antenna for call, at one side of the second body 102. The antenna 175 may be installed at the second body 102 so as to drawn-out.

Further, the first rear case 112 of the first body 101 includes a slide module 170, of which one part slidably couples the first body 101 and the second body 102 with each other.

Another part of the slide module 170 may be disposed at the second front case 167 of the second body 102 with a non-exposed status as shown in the drawing.

In the present invention, the second video input unit 171 and so on are disposed at the second body 102. However, the position of the second video input unit 171 is not limited thereto.

For instance, at least one of the components explained to be disposed at the second rear case 168 such as the second video input unit 171 may be also mounted to the first body 101, especially, to the first rear case 112. In this case, components disposed at the first rear case 112 in the closed configuration can be protected by the second body 102. Furthermore, it may be configured to form only the first video input unit 121 without the second video input unit 171. Here, the first video input unit 121 is rotatably formed to capture an object that can be captured by the second video input unit 171.

In addition, the portable terminal 100 of the present invention is not limited to the slide type of terminal shown in FIGS. 8 and 9, but may be applied to various portable terminals such as folder type and swing type of terminals.

Figure 10:
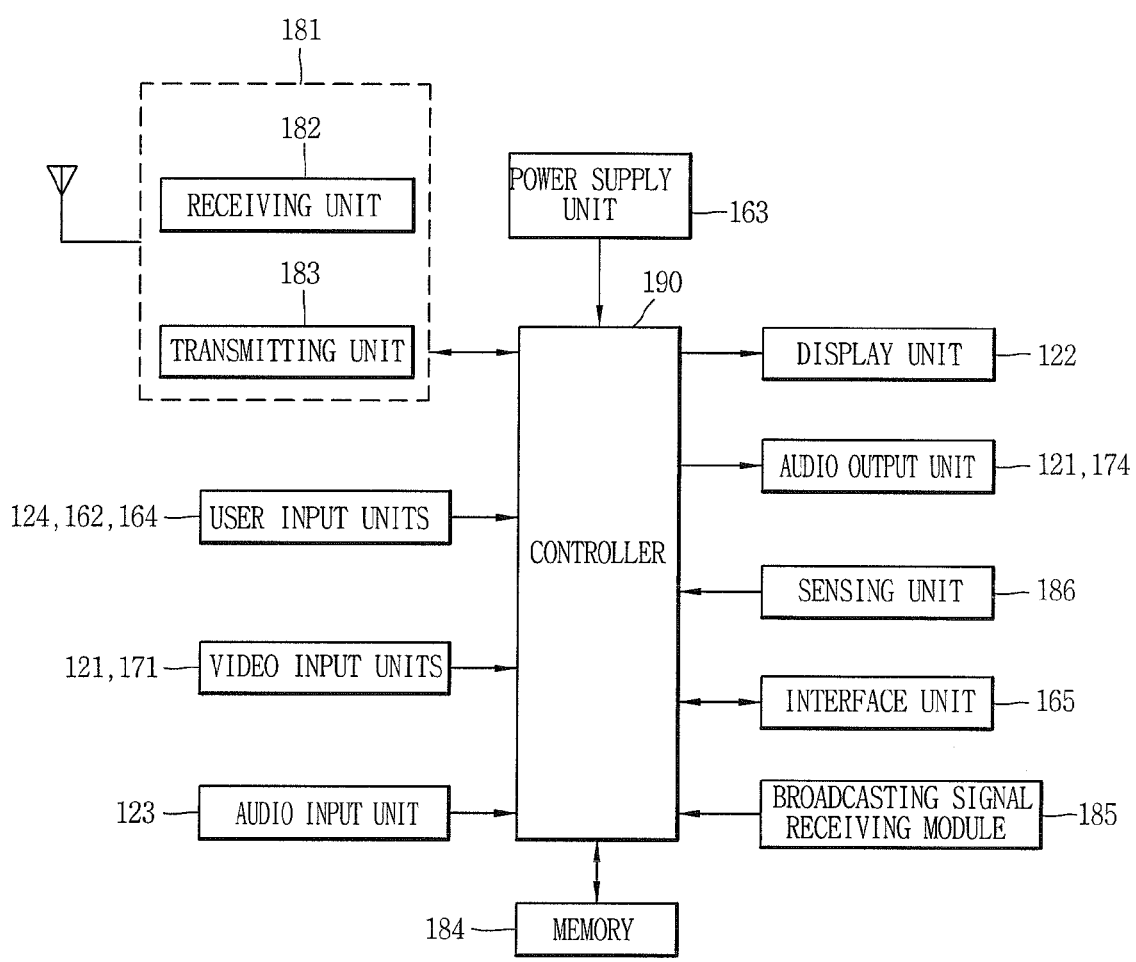
FIG. 10 is a block diagram showing the portable terminal according to the present invention.

FIG. 10 is a block diagram showing the portable terminal according to the present invention.

As shown in FIG. 10, the portable terminal of the present invention comprises a wireless communications module 181, user input units 124, 162 and 164, video input units 161 and 171, an audio input unit 123, a display unit 122, audio output units 121 and 174, a sensing unit 186, an interface unit 165, a broadcasting signal receiving module 185, a memory 184, a power supply unit 163, and a controller 190.

The controller 190 typically controls the overall operations of the portable terminal 100. For instance, the controller 190 performs the control and processing associated with voice calls, data communications, and video calls.

Furthermore, the controller 190 may compensate for a difference between an initial position and a preset initial position of the magnet 33.

A difference between the current center of the magnet 33 and the initial center of the magnet 33 preset by the magnetism sensing portion 36 may be compensated thus to enhance accuracy of input. The controller 190 may be set so as to be operated whenever the portable terminal is booted.

The wireless communications module 181 transmits or receives wireless signals to/from a base station through an antenna. For instance, the wireless communications module 181 transmits or receives voice data, text data, video data, and control data under control of the controller 190. And, the wireless communications module 181 includes a transmitting portion 183 for transmitting a signal through a modulation process, and a receiving portion 182 for demodulating a received signal.

As shown in FIG. 8, the user input units 124, 162 and 164 provide, to the controller 190, key input datan input by a user so as to control the operation of the portable terminal 100.

The video input units 161 and 171 process image frames of still images or moving images captured by an image sensor in a video call mode or a capturing mode. Then, the processed image frames are converted into video data that can be displayed on the display unit 122, and then are output to the display unit 122.

Under control of the controller 190, the image frames processed by the video input units 161 and 171 may be stored in the memory 184, or may be outwardly transmitted through the wireless communications module 181.

The audio input unit 123 receives external audio signals by a microphone in a call mode, or a recording mode, or a voice recognition mode, and so on, and then processes the received audio signals into electric voice data. In the case of a call mode, the processed voice data is converted into data that can be transmitted to the base station through the wireless communications module 181, and then is output to the wireless communications module 181. In the case of a recording mode, the processed voice data is output so as to be stored in the memory 184.

The audio input unit 123 may include assorted noise removing algorithms to remove noise generated in the course of receiving an external audio signal.

The display unit 122 may display information processed in the portable terminal. For instance, when the portable terminal is in a call mode, User Interface (UI) or Graphic User Interface (GUI) relating to a call is displayed under control of the controller 190. And, when the portable terminal is in a video call mode or a capturing mode, a captured image or UI or GUI is displayed under control of the controller 190. When the display unit 122 includes a touch screen, it serves as an input device as well as an output device.

In various modes including a call-receiving mode, a call-placing mode, a recording mode, a voice recognition mode and a broadcast reception mode, the audio output units 121 and 174 convert audio data received from the wireless communication module 181, or audio data stored in the memory 184 thereby to outwardly output under control of the controller 190.

The audio output units 121 and 174 output audio signals relating to functions executed in the portable terminal (e.g., call signal receiving sound, message receiving sound, and so on). The audio output units 121 and 174 include a speaker, a receiver, a buzzer, and so on.

The sensing unit 186 senses the current status of the portable terminal such as an open/close status of the portable terminal, a position of the portable terminal, and presence or absence of a user's contact with the portable terminal, thereby generating sensing signals to control the operation of the portable terminal. As an example, when the portable terminal 100 is a slide-type portable terminal, the sensing unit 186 may sense whether a sliding portion of the portable terminal 100 is open or closed. Then, the sensing unit 186 outputs results of the sensing to the controller 190, and thereby the operation of the portable terminal is controlled. Other examples include the sensing unit 186 sensing the presence or absence of power provided by the power supply unit 163, the presence or absence of coupling or other connection between the interface unit 165 and an external device, and so on.

The interface unit 165 interfaces a wire/wireless headset, an external charger, a wire/wireless data port, and a card socket (e.g., memory card, SIM/UIM card) rather than the portable terminal, with all types of external devices connected to the portable terminal.

The interface 165 receives data or power from an external device, and transmits it to each component inside the portable terminal. Otherwise, the interface 165 transmits data inside the portable terminal to an external device.

The memory 184 may store a program to activate the controller 190, or may temporarily store input/output data (e.g., phonebook, messages, still images, moving images, and so on).

Furthermore, the memory 184 stores information relating to the initial position of the magnet 33. The memory 184 includes the concepts of the general hard disc, card-type memory (e.g., SD or XD memory), flash memory, RAM, ROM, and so on.

The broadcasting signal receiving module 185 receives a broadcasting signal transmitted through satellite or terrestrial waves, etc., and converts the signal into broadcasting data that can be output to the display unit 122 thereby to output it to the controller 190. The broadcasting signal receiving module 185 receives broadcasting-related additional data (e.g., Electric Program Guide: EPG, channel list, etc.). Broadcasting data and additional data converted by the broadcasting signal receiving module 185 may be stored in the memory 184.

The power supply unit 27 receives external or internal power under control of the controller 190, and supplies the power to each component of the portable terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An input device, comprising:
   a circuit board having a magnetism sensing portion for sensing changes of magnetism;
   a magnet disposed above the circuit board by a prescribed height, and configured to move in a plurality of directions; and
   a shuttle having a magnet mounting portion for fixing the magnet at the center thereof, and having a plurality of elastic connecting portions radially disposed around the magnet mounting portion, the elastic connecting portions formed in curved lines from the center of the magnet so as to elastically support the magnet mounting portion.

2. The input device of clam 1, wherein end parts of the elastic connecting portions are supported by being fixed to a housing having a through hole at the center thereof.

3. The input device of claim 2, wherein the housing comprises:
   one pair of hooks formed at an edge of the housing and fixed to the circuit board; and
   one pair of locator pins inserted into the circuit board, and configured to fix the position of the housing with respect to the circuit board.

4. The input device of claim 2, wherein the magnet is covered with a cap, and
   wherein the cap is installed so as to be protruding from the through hole and to move within a region of the through hole.

5. The input device claim 1, wherein the magnetism sensing portion is mounted onto a lower surface of the circuit board, and
   wherein a dome switch configured to perform an input operation as the magnet mounting portion is pressed is mounted to an upper surface of the circuit board.

6. The input device of claim 5, wherein the magnet mounting portion is formed so that its lower surface may have a round shape.

7. The input device of claim 6, wherein a lubrication member for reducing friction of the magnet mounting portion is provided on an upper surface of the dome switch.

8. The input device of claim 7, wherein the lubrication member has a mesh-type of pattern on its upper surface contacting the magnet mounting portion.

9. The input device of claim 7, wherein the lubrication member is bonded onto the circuit board in the form of sheet.

10. The input device of claim 7, wherein each of the elastic connecting portions is horizontally disposed in an 'S' shape.

11. The input device of claim 9, wherein the elastic connecting portions are disposed in three in number with a gap therebetween of 120°.

12. The input device of claim 10, wherein on lower surfaces of the elastic connecting portions, formed are horizontal status maintaining protrusions that come in friction with the lubrication member, and configured to maintain each horizontal status of the elastic connecting portions.

13. The input device of claim 1, further comprising a controller for compensating for a difference between an initial position and a preset initial position of the magnet.

14. The input device of claim 13, wherein the controller is set so as to be operated whenever the portable terminal is booted.

15. A portable terminal, comprising:
a terminal body; and
an input device installed at the terminal body,
wherein the input device comprises:
a circuit board having a magnetism sensing portion, and configured to sense changes of magnetism;
a magnet disposed above the circuit board by a prescribed height, and configured to move in a plurality of directions; and
a shuttle having a magnet mounting portion for fixing the magnet at the center thereof, and having a plurality of elastic connecting portions radially disposed around the magnet mounting portion, the elastic connecting portions formed in curved lines from the center of the magnet so as to elastically support the magnet mounting portion.

16. The input device of clam 15, wherein end parts of the elastic connecting portions are supported by being fixed to a housing having a through hole at the center thereof.

17. The input device of claim 16, wherein the housing comprises:
one pair of hooks formed at an edge of the housing and fixed to the circuit board; and
one pair of locator pins inserted into the circuit board, and configured to fix the position of the housing with respect to the circuit board.

18. The input device of claim 16, wherein the magnet is covered with a cap, and
wherein the cap is installed so as to be protruding from the through hole and to move within a region of the through hole.

19. The input device claim 15, wherein the magnetism sensing portion is mounted onto a lower surface of the circuit board, and
wherein a dome switch configured to perform an input operation as the magnet mounting portion is pressed is mounted to an upper surface of the circuit board.

20. The input device of claim 19, wherein the magnet mounting portion is formed so that its lower surface may have a round shape.

21. The input device of claim 20, wherein a lubrication member for reducing friction of the magnet mounting portion is provided on an upper surface of the dome switch.

22. The input device of claim 21, wherein the lubrication member has a mesh-type of pattern on its upper surface contacting the magnet mounting portion.

23. The input device of claim 21, wherein the lubrication member is bonded onto the circuit board in the form of sheet.

24. The input device of claim 21, wherein each of the elastic connecting portions is horizontally disposed in an 'S' shape.

25. The input device of claim 23, wherein the elastic connecting portions are disposed in three in number with a gap therebetween of 120°.

26. The input device of claim 24, wherein on lower surfaces of the elastic connecting portions, formed are horizontal status maintaining protrusions that come in friction with the lubrication member, and configured to maintain each horizontal status of the elastic connecting portions.

27. The input device of claim 15, further comprising a controller for compensating for a difference between an initial position and a preset initial position of the magnet.

28. The input device of claim 27, wherein the controller is set so as to be operated whenever the portable terminal is booted.

* * * * *